United States Patent
Umemoto

(10) Patent No.: US 6,542,300 B2
(45) Date of Patent: Apr. 1, 2003

(54) POLARIZER WITH COMPOSITE PHASE COMPENSATION FILM

(75) Inventor: Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/984,226

(22) Filed: Oct. 29, 2001

(65) Prior Publication Data

US 2002/0075564 A1 Jun. 20, 2002

(30) Foreign Application Priority Data

Oct. 30, 2000 (JP) .................................... 2000-330070

(51) Int. Cl.⁷ .................... G02B 5/30; G02B 27/28; G02F 1/1335
(52) U.S. Cl. ................ 359/491; 359/490; 359/497; 359/499; 359/500; 349/118; 349/119
(58) Field of Search .................... 359/485, 494, 359/497, 499, 500, 490, 491, 492; 349/117, 118, 119

(56) References Cited

U.S. PATENT DOCUMENTS

| | | | |
|---|---|---|---|
| 2,441,049 A | | 5/1948 | West |
| 5,194,975 A | * | 3/1993 | Akatsuka et al. ............ 349/118 |
| 5,227,903 A | | 7/1993 | Miyazawa et al. |
| 5,440,413 A | * | 8/1995 | Kikuchi et al. ............. 349/118 |
| 5,579,139 A | | 11/1996 | Abileah et al. |
| 5,594,568 A | | 1/1997 | Abileah et al. |
| 6,219,122 B1 | * | 4/2001 | Uchida et al. ........... 252/299.1 |
| 6,307,608 B1 | * | 10/2001 | Sakamoto ................... 349/117 |
| 6,330,108 B1 | * | 12/2001 | Nishikouji et al. ........... 349/96 |
| 6,407,787 B1 | * | 6/2002 | Sekime et al. .............. 349/113 |
| 6,411,344 B2 | * | 6/2002 | Fujii et al. ................. 349/117 |
| 6,433,853 B1 | * | 8/2002 | Kameyama et al. ........ 349/115 |

FOREIGN PATENT DOCUMENTS

| | | | |
|---|---|---|---|
| EP | 0 350 075 A2 | 1/1990 | |
| JP | 4-305602 | 10/1992 | ............ G02B/5/30 |
| JP | 4-371903 | 12/1992 | ............ G02B/5/30 |
| JP | 3165168 | 3/2001 | ............ G02B/5/30 |
| JP | 3165178 | 3/2001 | ............ G02B/5/30 |

OTHER PUBLICATIONS

Patent Abstracts of Japan, 04–371903, Dec. 24, 1992.
Patent Abstracts of Japan, 04–305602, Oct. 28, 1992.

* cited by examiner

*Primary Examiner*—John Juba, Jr.
(74) *Attorney, Agent, or Firm*—Sughrue Mion, PLLC

(57) ABSTRACT

There is provided a polarizer constituted by a polarizing element, and at least one transparent protective film constituted by two layers of retardation films with an in-plane retardation in a range of from 190 to 320 nm with respect to light having a wavelength of 550 nm. The transparent protective film is bonded onto one of opposite surfaces of the polarizing element so that a fast axis of each of the retardation films is parallel with an absorption axis of the polarizing element. The two layers of retardation films are constituted by a combination of a retardation film with Nz of from 0.05 to 0.2 and a retardation film with Nz of from 0.3 to 0.45 in the condition of nx>ny and Nz=(nx−nz)/(nx−ny) in which nx and ny are in-plane refractive indices of the retardation films respectively, and nz is a refractive index in a direction of thickness of each of the retardation films.

4 Claims, 3 Drawing Sheets

POLARIZER WITH COMPOSITE PHASE COMPENSATION FILM

BACKGROUND OF THE INVENTION

1. Field of the Invention

The present invention relates to a polarizer by which light leakage based on changes of polarizing element axes caused by a change of a viewing angle in between polarizing elements disposed in the form of crossed-Nicol can be prevented in a wide-range visible light region to thereby achieve liquid-crystal display of a wide viewing angle, or the like.

The present application is based on Japanese Patent Application No. 2000-330070, which is incorporated herein by reference.

2. Description of the Related Art

In polarizing elements disposed in the form of crossed-Nicol, there was a problem that light leakage might occur when the azimuth was changed to an oblique one even in the case where the light could be cut off ordinarily in a normal-line (frontal) direction. This was because the relationship in crossed-Nicol optical axis is displaced or collapsed between the polarizing elements due to the change of the apparent angle caused by the oblique view. As a background-art device to solve the light leakage problem caused by such an azimuth angle, there was known a polarizer in which a transparent protective film exhibiting birefringence with a retardation of from 190 to 320 nm and with Nz (which will be described later) of from 0.1 to 0.9 was disposed so that a slow axis of the transparent protective film is parallel with the absorption axis of a polarizing element (see Unexamined Japanese Patent Publication No. Hei. 4-305602).

The background-art polarizer was provided to compensate for the displacement in absorption axis or the like between polarizing elements due to the change of the viewing angle as follows. As a transparent protective film to be bonded to one or each of opposite surfaces of a polarizing element for improving durability against penetration of moisture or the like, a film exhibiting retardation characteristic of about a half wavelength with respect to visible light was used instead of an isotropic transparent protective film constituted by a triacetylcellulose (TAC) film or the like exhibiting little birefringence. There was, however, a problem that the compensating measure could not cope with wavelength dispersion.

That is, wavelength dispersion, which is a phenomenon that the retardation varies in accordance with the wavelength, generally occurs in a retardation film. Hence, the function of the retardation film as a half-wave plate works only for light with a specific wavelength. For light with the other wavelengths, the retardation film cannot function as a half-wave plate accurately, so that the light with the other wavelengths is inferior in the characteristic of linearly polarized light. There therefore arises a coloring problem. Incidentally, when the characteristic of the retardation film is optimized to compensate for light with a wavelength near to 550 nm exhibiting the maximum luminous efficacy, light with the other wavelengths is colored with blue because the condition for the light is displaced from the aforementioned optimizing condition. Hence, when the retardation film is applied to a liquid-crystal display device or the like, the coloring problem reveals itself as a problem in deterioration of neutral characteristic of display.

SUMMARY OF THE INVENTION

An object of the present invention is to develop a polarizer in which light leakage hardly occurs while coloring owing to wavelength dispersion hardly occurs to thereby achieve excellent neutral characteristic even in the case where polarizing elements disposed in the form of crossed-Nicol are obliquely viewed at an azimuth displaced from the optical axis thereof.

According to the present invention, there is provided a polarizer constituted by: a polarizing element; and at least one transparent protective film constituted by two layers of retardation films with an in-plane retardation in a range of from 190 to 320 nm with respect to light having a wavelength of 550 nm, the transparent protective film being bonded onto one of opposite surfaces of the polarizing element so that a fast axis of each of the retardation films is parallel with an absorption axis of the polarizing element, the two layers of retardation films being constituted by a combination of a retardation film with Nz of from 0.05 to 0.2 and a retardation film with Nz of from 0.3 to 0.45 in the condition of nx>ny and Nz=(nx−nz)/(nx−ny) in which nx and ny are in-plane refractive indices of the retardation films respectively, and nz is a refractive index in a direction of thickness of each of the retardation films.

According to the present invention, there can be obtained a polarizer which exhibits a compensating function for canceling the change of an optical axis such as an absorption axis of a polarizing element by changing an optical axis such as a fast axis of each of retardation films constituting a transparent protective film in accordance with the change of a viewing angle so that both light leakage and wavelength dispersion of retardation can be suppressed not only at a viewing angle parallel with the optical axis of polarizing elements disposed in the form of crossed-Nicol but also at a viewing angle displaced from the optical axis to thereby achieve excellent neutral characteristic (colorlessness) and make linear polarizing characteristic unchangeable. The use of the polarizer permits the formation of a liquid-crystal display device, or the like, excellent in display quality such as high contrast ratio at a wide viewing angle. In addition, the polarizer is excellent in reduction of thickness and weight because the two layers of retardation films serve as a transparent protective film.

Features and advantages of the invention will be evident from the following detailed description of the preferred embodiments described in conjunction with the attached drawings.

DETAILED DESCRIPTION OF THE PREFERRED EMBODIMENTS

Figure 1:
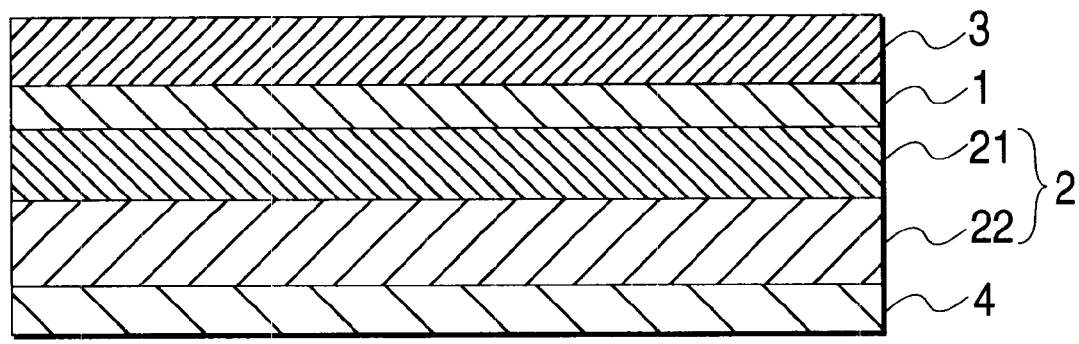
FIG. 1 is an explanatory view showing an embodiment of the present invention.

The polarizer according to the present invention is constituted by: a polarizing element; and at least one transparent protective film constituted by two layers of retardation films with an in-plane retardation in a range of from 190 to 320 nm with respect to light having a wavelength of 550 nm, the transparent protective film being bonded onto one of opposite surfaces of the polarizing element so that a fast axis of each of the retardation films is parallel with an absorption axis of the polarizing element, the two layers of retardation films being constituted by a combination of a retardation film with Nz of from 0.05 to 0.2 and a retardation film with Nz of from 0.3 to 0.45 in the condition of nx>ny and Nz=(nx−nz)/(nx−ny) in which nx and ny are in-plane refractive indices of the retardation films respectively, and nz is a refractive index in a direction of thickness of each of the retardation films. FIG. 1 shows an example of the polarizer. In FIG. 1, the polarizer has a polarizing element 1, transparent protective films 2 and 3, and an adhesive agent layer 4. The transparent protective film 2 has two layers constituted by retardation films 21 and 22.

As the polarizing element, it is possible to use a suitable one capable of transmitting linearly polarized light when natural light is made incident on the polarizing element, without any particular limitation. The preferred polarizing element is a polarizing element by which transmitted light excellent in the degree of polarization can be obtained with good light transmittance. From this point of view, it is preferable to use an absorption-dichromatic polarizing element which transmits linearly polarized light while absorbing the other light when natural light is made incident on the polarizing element. Particularly from the point of view of handling properties such as reduction in thickness, flexibility, and so on, the absorption-dichromatic polarizing element is preferably made of a polarizing film. Incidentally, the absorption-dichromatic polarizing element may be constituted by an oriented layer obtained by applying a liquid-crystal dichromatic dye.

As the absorption-dichromatic polarizing element made of a polarizing film, it is also possible to use any suitable one. From the point of view of obtaining linearly polarized light in a wide-range visible light wavelength region, or the like, it is possible to use a polyvinyl alcohol film made of a polymer such as polyvinyl alcohol or partially formalized polyvinyl alcohol, the film being drawn and oriented after impregnated with iodine or/and a dichromatic dye such as an azo dye, an anthraquinone dye, a tetrazine dye, or the like, by a suitable system such as an adsorption system. Especially, a uniaxially drawn film is preferably used.

As shown in FIG. 1, the transparent protective films 2 and 3 are bonded/laminated onto one or both of opposite surfaces of the polarizing element 1. In the present invention, at least the transparent protective film 2, which is disposed on one of the opposite surfaces of the polarizing element 1, is made of two layers of retardation films 21 and 22 constituted by a combination of a retardation film with Nz of from 0.05 to 0.2 and a retardation film with Nz of from 0.3 to 0.45, each of the retardation films exhibiting an in-plane retardation of from 190 to 320 nm with respect to light having a wavelength of 550 nm. In the above description, Nz is defined by the expression: Nz=(nx−nz)/(nx−ny) in the condition of nx>ny when nx and ny are in-plane refractive indices of each retardation film, and nz is a refractive index in a direction of the thickness of each retardation film.

In the above description, the two layers of retardation films are bonded/laminated to/on each other so that the fast axis of each of the retardation films is parallel with the absorption axis of the polarizing element. The parallel relationship between the fast axis and the absorption axis does not mean a perfect parallel state in terms of production accuracy or the like. In terms of the compensating effect, however, the smaller the crossing angle between the two axes, the better the relationship between the two axes. In this case, the fast axis of each of the retardation films and the absorption axis of the polarizing element are based on the viewing angle from the front (azimuth angle: 0). The sequence of laminating the retardation films with different Nz can be selected at option. In FIG. 1, the retardation film 22 with Nz of from 0.3 to 0.45 is bonded/laminated onto the polarizing element 1 through the retardation film 21 with Nz of from 0.05 to 0.2. This sequence of arrangement is preferred from the point of view of the compensating effect. Incidentally, the in-plane retardation can be calculated as a product (Δn·d) of the refractive index difference (Δn=nx−ny) and the thickness (d) of each of the retardation films.

For example, each of the retardation films can be obtained as a birefringent film constituted by a high molecular film drawn by a suitable system such as a uniaxial drawing system, a biaxial drawing system, or the like. A retardation film excellent in light transmittance and little in orientation unevenness and retardation unevenness is used preferably. A retardation film exhibiting the aforementioned characteristics of retardation and Nz can be formed by a suitable method such as a method in which a heat-shrinkable film is bonded to a high molecular film and oriented under the function of shrinking force of the heat-shrinkable film by heating to thereby control the refractive index in the direction of the thickness thereof, a method in which a high molecular film is obtained while controlling orientation by applying an electric field in the direction of the thickness thereof and is drawn, or the like. In this case, the retardation and Nz can be changed by changing the kind of polymer of the film as a subject of the process, the drawing condition, the kind of the heat-shrinkable film, the applied voltage, and so on. Incidentally, in a general drawing process such as a uniaxial drawing process, Nz is set to be not larger than 0 or not smaller than 1.

As the high molecular compound forming the retardation film, it is possible to use a suitable one without any particular limitation. Especially, a compound excellent in transparency is preferred. From the point of view of suppressing the change of the retardation caused by the generation of stress, a compound with a small photoelastic coefficient is preferred. Incidentally, examples of the preferred compound include: polycarbonate; polyallylate; polysulfone; polyolefin such as polypropylene; polyester such as polyethylene terephthalate or polyethylene naphthalate; vinyl alcohol polymer; norbornene polymer; acrylic polymer; styrene polymer; cellulose polymer; mixture polymer of two kinds or three or more kinds of the aforementioned polymers; and so on.

The bonding/lamination of the polarizing element onto the transparent protective film or onto the retardation film as one of constituent members of the transparent protective film is provided for the purposes of: improving the protecting effect; preventing the optical axis from being displaced; preventing foreign matter such as dust or the like from entering the polarizing element; and so on. For example, the bonding/lamination can be performed by a suitable system such as a bonding system using a transparent adhesive layer or the like. The adhesive agent used in the system is not particularly limited. From the point of view of preventing the respective optical characteristics of the polarizing element and the transparent protective film from changing, a material not requiring any high-temperature process at the time of curing/drying is preferred and a material not requiring any long-term curing process or any drying time is preferred. From this point of view, a polyvinyl alcohol adhesive agent or tackifier can be used preferably. Incidentally, the adhesive layer for bonding the retardation film and the polarizing element to each other is not shown in FIG. 1.

As the tackifier, it is possible to use a suitable one that is formed from a suitable polymer such as acrylic polymer, silicone polymer, polyester, polyurethane, polyether, synthetic rubber, or the like. Especially, an acrylic trackifier is preferred from the point of view of optical transparency, tackiness, weather resistance, and so on. Incidentally, as shown in FIG. 1, the adhesive layer 4, especially the tacky layer, maybe provided on one or each of opposite surfaces of the polarizer for the purpose of bonding the polarizer onto a liquid-crystal cell or the like as a subject to be bonded, as occasion demands. In this case, a separator or the like may be preferably temporarily attached to the tacky layer in order to prevent the surface of the tacky layer from being contaminated until the surface of the tacky layer is exposed to the outside and put into practical use.

Incidentally, as shown in FIG. 1, such transparent protective films provided for suitable purposes such as for improvement in reinforcement, heat resistance, weather resistance, or the like, may be disposed on opposite surfaces of the polarizing element 1 as occasion demands. In this case, one of the transparent protective films may be formed, in accordance with the background art, as a coating layer of a suitable resin such as TAC or a layer of a laminate of resin films when the transparent protective film is not made of the aforementioned retardation film.

The transparent protective layer provided in the aforementioned case preferably has a retardation as small as possible in order to maintain the above-mentioned compensating effect. If there is some retardation, it is preferable that Nz is 0 or 1 or near 0 or 1. The transparent protective layer with Nz of 0 or near 0 is preferably provided so that the fast axis of the layer is parallel with the absorption axis of the polarizing element. The transparent protective layer with Nz of 1 or near 1 is preferably provided so that a slow axis of the layer is parallel with the absorption axis of the polarizing element.

Figure 2A:
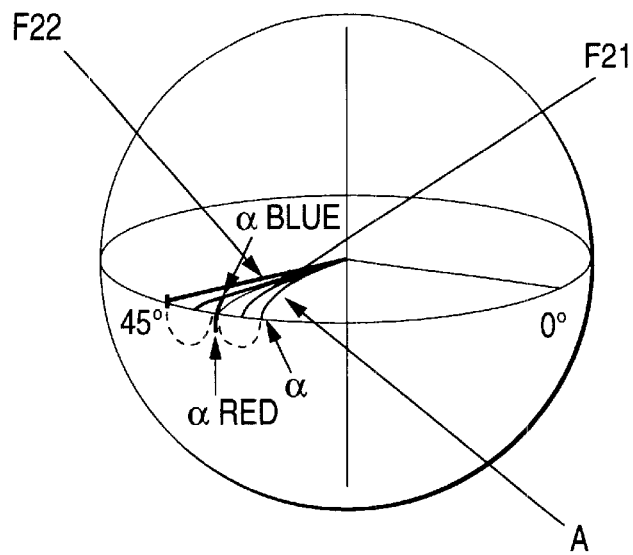
FIGS. 2A to 2C are model views each showing a state in which the axis of the polarizer is displaced in accordance with the change of the viewing angle.
Figure 2B:
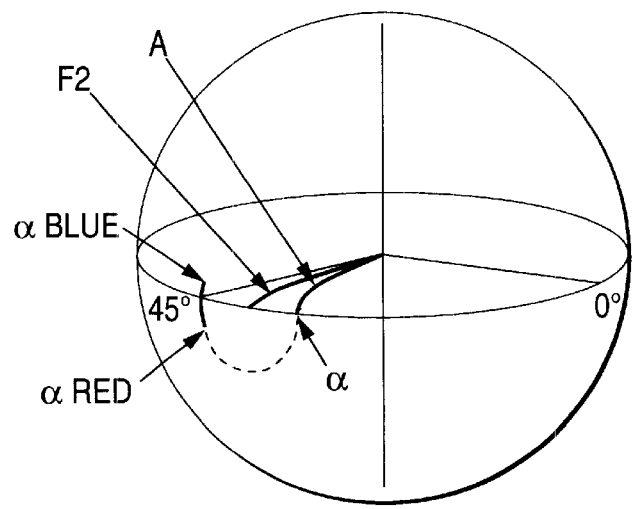
Figure 2C:
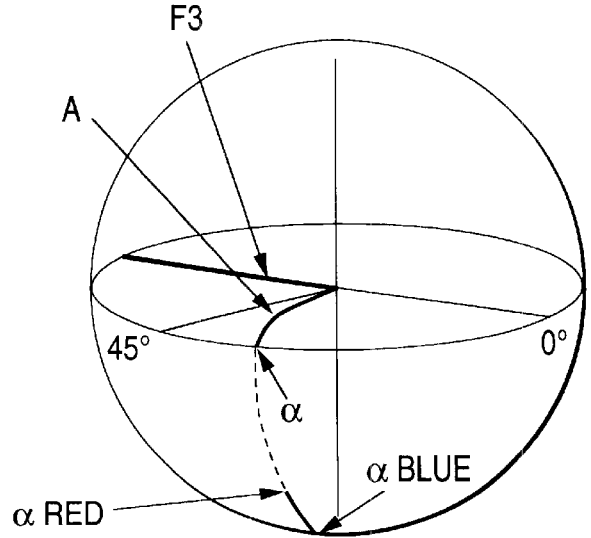

FIGS. 2A to 2C are model views each using a Poincare sphere for showing a state of displacement of the axis of the polarizer owing to the change of the viewing angle. FIG. 2A shows the polarizer according to the present invention. FIGS. 2B and 2C show the background-art polarizers. That is, FIG. 2B shows the polarizer according to Unexamined Japanese Patent Publication No. Hei. 4-305602 except for the alteration of the fast axis from the slow axis, in which a transparent protective film having a retardation of from 190 to 320 nm and Nz of from 0.1 to 0.9 and exhibiting birefringence is disposed so that the fast axis of the transparent protective film is parallel with the absorption axis of a polarizing element. FIG. 2C shows the polarizer in which a film having an in-plane retardation not larger than about 30 nm and having Nz in a range of from 1 to 30 is used as the transparent protective film.

In the Poincare sphere, the radius expresses a viewing angle. The solid line shows a state in which the apparent angle of the optical axis changes in accordance with the change of the viewing angle viewed from the direction of zero degree in the condition that the absorption axis A of the polarizing element is arranged at 45 degrees. Incidentally, the change of the optical axis is larger than the actual change for explanation's sake. Although FIGS. 2A to 2C show the absorption axis A of the polarizing element and the fast axis F of the retardation film (transparent protective film), the relationship between the transmission axis of the polarizing element and the slow axis of the retardation film will be understood easily because the transmission axis of the polarizing element always forms a perpendicularly crossing state with respect to the absorption axis thereof and the slow axis is obtained by simply inverting the direction of rotation of linearly polarized light in the fast axis.

In each of FIGS. 2A to 2C, the absorption axis A of the polarizing element changes to become gradually parallel with the viewing angle in accordance with the change of the viewing angle. That is, the angle of the absorption axis A in each of FIGS. 2A to 2C changes largely from its original angle. On the other hand, in the background art shown in FIG. 2C, the angle of the fast axis F3 of the transparent protective film can be regarded as 90 degrees as shown in FIG. 2C because the fast axis F3 is generated always approximately perpendicular to the viewing angle in accordance with the change of the viewing angle. Moreover, the retardation gradually increases in accordance with the change of the viewing angle. When, for example, the maximum value of the retardation is about 40 nm, light a transmitted through the polarizing element is subjected to rotational transformation with the fast axis F3 as its center on the Poincare sphere. At this time, the magnitude of the action varies in accordance with the wavelength of the light, so that the rotational speed of the light increases as the wavelength of the light decreases (chromatic dispersion). As a result, the light broadens from $\alpha$blue to $\alpha$red as shown in FIG. 2C. Hence, the azimuth angle changes with respect to polarized light which is supposed to be made to exit, so that the transmittance increases (light leakage).

On the other hand, in the background art shown in FIG. 2B, the angle of the fast axis F2 of the transparent protective film changes to always take a value between its original angle and the angle of the absorption axis A in accordance with the change of the absorption axis A as shown in FIG. 2B when Nz takes a value (0.25 in FIG. 2B) which is in a range of from 0.1 to 0.9 and which is not larger than 0.5. In FIG. 2B, the change of the fast axis F2 in accordance with the change of the viewing angle is always a half of the change of the absorption axis A. In this case, the influence of the retardation does not appear in the frontal direction because the optical axis of the transparent protective film coincides with that of the polarizing element, but the influence of the retardation appears when the optical axis of the transparent protective film and the optical axis of the polarizing element are displaced from each other.

In the background art shown in FIG. 2B, the in-plane retardation is equal to about a half wavelength of visible light. Hence, light a transmitted through the polarizing element is subjected to rotational transformation by $\pi$ with the fast axis F2 as its center on the Poincare sphere, so that the angle of the light is compensated so as to be equal to the original angle of the absorption axis A. At the same time, light with a shorter wavelength, however, rotates more rapidly because of wavelength dispersion in the same manner as in FIG. 2C. Hence, the light broadens from $\alpha$blue to $\alpha$red as shown in FIG. 2B. Hence, when, for example, the center wavelength is 550 nm, light leakage of blue or red light occurs.

On the contrary, the fast axis F21 of the retardation film 21 as one of constituent members of the transparent protective film 2 in the polarizer according to the present invention changes by an angle larger than a half of the difference between its original angle and the changed angle of the absorption axis A because Nz of the retardation film is in a range of from 0.05 to 0.2 (0.13 in FIG. 2A). Hence, the change of the axis owing to the viewing angle always becomes about ¾ as large as the change of the absorption axis A.

In the aforementioned case, the influence of the retardation appears along with the axial displacement between the retardation film 21 and the polarizing element in the same manner as in FIG. 2B. Hence, light a transmitted through the polarizing element is subjected to rotational transformation by Π with the fast axis F21 as its center on the Poincare sphere. As a result, the light broadens from αblue to αred because of wavelength dispersion. At the same time, the angle of the light is compensated so as to be intermediate between the changed angle of the absorption axis A owing to the viewing angle and the original angle, so that the light is made incident on the next retardation film 22 as the other of constituent members of the transparent protective film.

Because Nz of the retardation film 22 is in a range of from 0.3 to 0.45 (0.37 in FIG. 2A), the fast axis F22 of the retardation film 22 changes by an angle smaller than a half of the difference between the changed angle of the absorption axis A and the original angle. Hence, the change of the fast axis F22 owing to the viewing angle is always about ¼ as large as the change of the absorption axis A. Also in the retardation film 22, the influence of the retardation appears along with the axial displacement between the retardation film 22 and the polarizing element, so that the angle of the fast axis F22 becomes intermediate between the angle range of the light αblue to αred subjected to rotational transformation in the retardation film 22 and the original angle of the absorption axis A.

As a result, the light αblue to αred subjected to rotational transformation in the retardation film 22 is further subjected to rotational transformation by π with the fast axis F22 as its center on the Poincare sphere. Hence, the light broadens from αblue to αred because of wavelength dispersion. The change in this case, however, has a function for canceling the previous change. Hence, the light is compensated so as to converge at the original angle of the absorption axis A regardless of the wavelength as shown in FIG. 2A. Hence, for example, even in the case where the center wavelength is 550 nm, light leakage of blue or red light is prevented.

The polarizer according to the present invention can be used preferably for the suitable purpose in accordance with the background art, that is, for the purpose of forming a liquid-crystal display device or the like. To put the polarizer into practical use, suitable functional layers such as a protective layer for various kinds of purposes, an anti-reflection layer or/and an anti-glare layer for the purpose of preventing surface reflection or the like, a light-diffusing layer, and so on, may be provided on one or both of opposite surfaces of the polarizer. The anti-reflection layer can be formed suitably as a light-coherent film such as a fluorine polymer coat layer, a multilayer metal-deposited film, or the like. The anti-glare layer can be also formed by a suitable system in which a resin coating layer containing fine particles is applied or a fine roughness structure is provided on a surface by a suitable system such as embossing, sandblasting, etching, or the like, to thereby diffuse surface-reflected light.

Further, the light-diffusing layer can be also formed in the same manner as the anti-glare layer. Incidentally, examples of the fine particles may include inorganic fine particles and organic fine particles with an average particle size of from 0.5 to 20 μm. The inorganic fine particles are made of silica, calcium oxide, alumina, titania, zirconia, tin oxide, indium oxide, cadmium oxide, antimony oxide, etc. and may be electrically conductive. The organic fine particles are made of crosslinked or non-crosslinked polymers such as polymethyl methacrylate and polyurethane. One member or a combination of two or more members suitably selected from the inorganic fine particles and the organic fine particles may be used as the fine particles. Incidentally, the anti-glare layer or the light-diffusing layer may be formed to be integrated with the transparent protective film by diffusion, surface-roughening, or the like, of the transparent protective film.

On the other hand, the liquid-crystal display device can be formed by use of the polarizer according to the present invention instead of the background-art polarizer and by disposing the polarizer on one or each of opposite sides of the liquid-crystal cell. In this case, it is preferable, from the point of view of improvement in display quality or the like, that the transparent protective film constituted by two layers of retardation films is disposed so as to be located between the polarizing element and the liquid-crystal cell. However, the location of the transparent protective film is not limited thereto.

Reference Example

A polyvinyl alcohol film was immersed in hot water so as to be swollen. Then, the film was dyed in an aqueous solution of iodine/potassium iodide and uniaxially drawn in an aqueous solution of boric acid to thereby obtain a polarizing element. Simplex transmittance, parallel transmittance and cross transmittance of the polarizing element were measured by a spectrophotometer. As a result, the transmittance was 43.5% and the degree of polarization was 99.9%.

EXAMPLE 1

Heat-shrinkable films were bonded to opposite surfaces of a polycarbonate (PC) film through tacky layers respectively. The resulting film was uniaxially drawn at 163° C. to thereby obtain a retardation film A with an in-plane retardation of 263 nm and Nz of 0.13 with respect to light having a wavelength of 550 nm (this rule will apply hereunder). On the other hand, the same film as defined above was drawn at 160° C. in the same manner as described above to thereby obtain a retardation film B with an in-plane retardation of 271 nm and Nz of 0.37. Then, a TAC film was bonded to one surface of the polarizing element obtained in Reference Example through a polyvinyl alcohol adhesive agent to thereby form a transparent protective film. Then, the retardation film A was bonded onto the other surface of the polarizing element through a polyvinyl alcohol adhesive agent and the retardation film B was superposedly bonded onto the retardation film A through an acrylic tacky layer to thereby form a transparent protective film. Thus, a polarizer was obtained. Incidentally, the drawing axis in each of the retardation films served as the slow axis. Accordingly, bonding was performed so that the fast axis perpendicular to the slow axis was parallel with the absorption axis of the polarizing element.

EXAMPLE 2

A polarizer was obtained in the same manner as in Example 1 except that a retardation film A with an in-plane retardation of 258 nm and Nz of 0.09 obtained by uniaxial drawing at 163° C. and a retardation film B with an in-plane retardation of 263 nm and Nz of 0.36 obtained by uniaxial drawing at 160° C. were used in Example 2.

EXAMPLE 3

A polarizer was obtained in the same manner as in Example 1 except that a retardation film A with an in-plane retardation of 281 nm and Nz of 0.19 obtained by uniaxial drawing at 162° C. and a retardation film B with an in-plane retardation of 257 nm and Nz of 0.31 obtained by uniaxial drawing at 160° C. were used in Example 3.

EXAMPLE 4

A polarizer was obtained in the same manner as in Example 1 except that a retardation film A with an in-plane retardation of 272 nm and Nz of 0.18 obtained by uniaxial drawing at 162° C. and a retardation film B with an in-plane retardation of 274 nm and Nz of 0.42 obtained by uniaxial drawing at 160° C. were used in Example 4.

Comparative Example 1

A polarizer was obtained in the same manner as in Example 1 except that the transparent protective film constituted by the retardation films A and B was replaced by a transparent protective film constituted by a TAC film with an in-plane retardation of 6 nm and Nz of 8.

Comparative Example 2

A polarizer was obtained in the same manner as in Example 1 except that the retardation film A was replaced by a retardation film with an in-plane retardation of 265 nm and Nz of 1.01. The retardation film was prepared by uniaxially orienting a PC film at 159° C. without any heat-shrinkable film bonded thereto.

Comparative Example 3

A polarizer was obtained in the same manner as in Example 1 except that a retardation film A with an in-plane retardation of 140 nm and Nz of 0.08 obtained by uniaxial drawing at 160° C. and a retardation film B with an in-plane retardation of 105 nm and Nz of 0.35 obtained by uniaxial drawing at 156° C. were used in Comparative Example 3.

Comparative Example 4

A polarizer was obtained in the same manner as in Example 1 except that a retardation film A with an in-plane retardation of 430 nm and Nz of 0.18 obtained by uniaxial drawing at 161° C. and a retardation film B with an in-plane retardation of 155 nm and Nz of 0.41 obtained by uniaxial drawing at 156° C. were used in Comparative Example 4.

Comparative Example 5

A polarizer was obtained in the same manner as in Example 1 except that the transparent protective film constituted by the retardation films A and B was replaced by a transparent protective film constituted by a retardation film with an in-plane retardation of 264 nm and Nz of 0.26. The retardation film was prepared by uniaxial drawing at 160° C. in the same manner as in Example 1.

Evaluation Test

Figure 3:
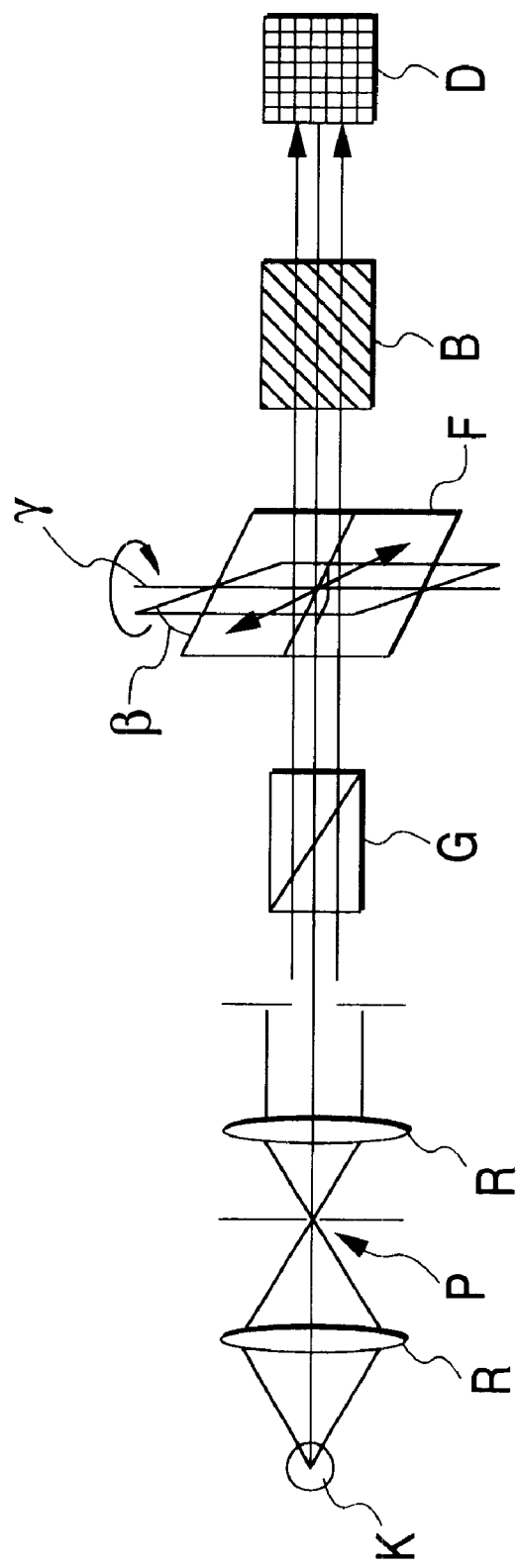
FIG. 3 is an explanatory view showing the measurement of spectroscopic intensity.

The spectroscopic intensity in the polarizer obtained in each of Examples 1 to 4 and Comparative Examples 1 to 5 was measured by an apparatus shown in FIG. 3. That is, parallel rays were generated by a combination of a light source K, a pinhole P and lenses R. The parallel rays were made incident, through a Glan-Thompson prism G, onto a sample F constituted by the polarizer obtained in each of Examples 1 to 4 and Comparative Examples 1 to 5. Light transmitted through the sample F was received by a detector D through a spectroscope B, so that the spectroscopic intensity of the light was measured.

Incidentally, for the measurement, the sample F was mounted onto a rotary stage capable of rotating by β around a rotation axis γ perpendicular to the parallel rays so that the transparent protective film constituted by the retardation film(s) was disposed on the light source side so as to be perpendicular to the light rays and so that the absorption axis of the polarizing element formed 45 degrees with respect to the rotation axis γ. The Glan-Thompson prism G was disposed so that its transmission axis was parallel with the absorption axis of the sample F to thereby form the relation of crossed-Nicol.

Transmittance was calculated from the ratio of the spectroscopic intensity measured as described above to reference spectroscopic intensity. L, a and b were calculated from the transmittance value on the basis of three stimulus values, so that the color difference ΔE0 from a black point was obtained. On the other hand, spectral transmittance was measured in the same manner as described above in the condition that the sample F was rotated by 75 degrees around the rotation axis γ. Hence, the color difference ΔE75 from a black point was obtained. At the same time, the color difference ΔE75-0 was calculated from the color coordinates at the respective rotation angles of 0 degree and 75 degrees on the basis of results of the aforementioned measurement. Incidentally, the reference spectroscopic intensity was based on the spectroscopic intensity of the apparatus in the condition that the Glan-Thompson prism G and the sample F were removed from the apparatus shown in FIG. 3, that is, in the condition that the apparatus had the light source K, the pinhole P, the lenses R, the spectroscope B, and the detector D.

Results of the above description were shown in the following table.

|  | Rotation Angle of 0 degree | | | | Rotation Angle of 75 degrees | | | | Color Difference |
|---|---|---|---|---|---|---|---|---|---|
|  | L | a | b | ΔE0 | L | a | b | ΔE75 | ΔE75-0 |
| Example 1 | 1.692 | 1.453 | −1.211 | 2.538 | 1.814 | 1.499 | −1.382 | 2.729 | 0.215 |
| Example 2 | 1.733 | 1.492 | −1.185 | 2.576 | 2.913 | 1.306 | −1.190 | 3.407 | 1.195 |
| Example 3 | 1.906 | 1.580 | −1.354 | 2.822 | 2.636 | 1.931 | −1.015 | 3.422 | 0.878 |
| Example 4 | 1.801 | 1.508 | −1.307 | 2.688 | 2.910 | 1.977 | −1.432 | 3.798 | 1.211 |
| Comparative Example 1 | 1.990 | 1.345 | −1.063 | 2.627 | 9.714 | 2.645 | 3.888 | 10.792 | 9.266 |
| Cornparative Example 2 | 1.691 | 1.502 | −1.208 | 2.564 | 7.310 | 2.972 | 3.320 | 8.561 | 7.365 |
| Comparative Example 3 | 1.773 | 1.433 | −1.189 | 2.571 | 18.31 | 8.026 | 1.242 | 20.030 | 17.968 |
| Comparative Example 4 | 2.588 | 1.878 | −1.315 | 3.457 | 14.25 | −2.819 | −6.663 | 15.981 | 13.663 |
| Comparative Example 5 | 1.892 | 1.544 | −1.288 | 2.761 | 2.923 | 4.515 | −6.011 | 8.066 | 5.674 |

It is apparent from the Table and results of the eye observation that difference was hardly recognized between the color difference ΔE0 from a black point in the frontal direction in each of Examples 1 to 4 and the color difference ΔE0 in each of Comparative Examples 1 to 5 but the color difference ΔE75 in the direction of 75 degrees in each of Examples 1 to 4 was obviously smaller than that in Comparative Example 1 showing a general polarizer or in Comparative Example 2 showing another kind of polarizer, that is, light leakage was suppressed in Examples 1 to 4. Hence, when Nz is not smaller than 1 as shown in each of Comparative Examples 1 and 2, the compensating effect cannot be found. On the other hand, the color difference ΔE75 in each of Comparative Examples 3 and 4 was larger than that in each of Comparative Examples 1 and 2. It is apparent that the compensating effect cannot be found also when the retardation exceeds a predetermined value.

On the other hand, in Comparative Example 5, the color difference ΔE75 was smaller than that in Comparative Example 1 but the values of a and b were large so that transmitted light was discolored to violet also in eye observation. This means that there is no optimal compensation for the blue or red region. It was confirmed that the color differenceΔE gradually increased and discoloring (light leakage) gradually increased also in eye observation as the rotation angle increased within a range between 0 degree and 75 degrees. On the contrary, in Examples 1 to 4, the color of transmitted light was substantially near to an achromatic color and the values of a and b were smaller than those in Comparative Example 5. It is apparent that the compensating effect was achieved in a wide-range visible light region in Examples 1 to 4. It is apparent from the above description that a polarizer capable of preventing light leakage owing to the change of the viewing angle in a wide-range visible light region can be obtained according to the present invention.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A polarizer comprising:

a polarizing element; and at least one transparent protective film constituted by two layers of retardation films with an in-plane retardation in a range of from 190 to 320 nm with respect to light having a wavelength of 550 nm, said transparent protective film being bonded onto one of opposite surfaces of said polarizing element so that a fast axis of each of said retardation films is parallel with an absorption axis of said polarizing element, said two layers of retardation films being constituted by a combination of a retardation film with Nz of from 0.05 to 0.2 and a retardation film with Nz of from 0.3 to 0.45 in a condition of nx>ny and Nz=(nx−nz)/(nx−ny) in which nx and ny are in-plane refractive indices of said retardation films respectively, and nz is a refractive index in a direction of thickness of each of said retardation films.

2. A polarizer according to claim 1, wherein said retardation film with Nz of from 0.05 to 0.2 is disposed on a polarizing element side.

3. A polarizer according to claim 1, wherein said polarizing element is absorption-dichromatic.

4. A polarizer according to claim 3, wherein said absorption-dichromatic polarizing element is made of a uniaxially drawn film of a polyvinyl alcohol compound containing iodine or dichromatic dye.

\* \* \* \* \*

Disclaimer

6,542,300 B2—Seiji Umemoto, Osaka (JP). POLARIZER WITH COMPOSITE PHASE COMPENSATION FILM. Patent dated April 1, 2003. Disclaimer filed June 15, 2005 by Assignee, Nitto Denko Corporation.

The term of this patent shall not extend beyond the expiration date of Patent No. 6,606,193; 6,667,787.

*(Official Gazette, September 20, 2005)*